United States Patent
Miedema

(10) Patent No.: US 11,909,574 B2
(45) Date of Patent: Feb. 20, 2024

(54) GROUPING CONFIGURATION-MODIFYING TRANSACTIONS FROM COLLABORATING AGENTS

(71) Applicant: Ciena Corporation, Hanover, MD (US)

(72) Inventor: David Miedema, Ottawa (CA)

(73) Assignee: Ciena Corporation, Hanover, MD (US)

( * ) Notice: Subject to any disclaimer, the term of this patent is extended or adjusted under 35 U.S.C. 154(b) by 12 days.

(21) Appl. No.: 17/335,457

(22) Filed: Jun. 1, 2021

(65) Prior Publication Data

US 2022/0385524 A1 Dec. 1, 2022

(51) Int. Cl.
*H04L 41/046* (2022.01)
*H04L 41/0853* (2022.01)

(52) U.S. Cl.
CPC ........ *H04L 41/046* (2013.01); *H04L 41/0856* (2013.01)

(58) Field of Classification Search
None
See application file for complete search history.

(56) References Cited

U.S. PATENT DOCUMENTS

| | | | | |
|---|---|---|---|---|
| 6,999,977 B1* | 2/2006 | Norcott | ................ | G06F 16/254 |
| | | | | 707/999.203 |
| 7,460,489 B2* | 12/2008 | Sugiarto | ................ | H04L 41/082 |
| | | | | 370/254 |
| 7,995,569 B2 | 8/2011 | Ashwood-Smith | | |
| 8,135,857 B1* | 3/2012 | Eng | ................ | H04L 12/6418 |
| | | | | 709/217 |
| 8,364,036 B2 | 1/2013 | Boertjes et al. | | |
| 8,799,427 B2* | 8/2014 | Sankaran | ............ | H04L 41/0813 |
| | | | | 370/328 |
| 9,060,215 B2 | 6/2015 | Miedema | | |
| 9,201,919 B2* | 12/2015 | Little | ................ | G06F 9/466 |
| 9,258,190 B2 | 2/2016 | Swinkels et al. | | |
| 9,367,298 B1* | 6/2016 | Eng | ................ | G06F 8/65 |
| 9,485,013 B2 | 11/2016 | Al Sayeed et al. | | |

(Continued)

FOREIGN PATENT DOCUMENTS

WO 2021030170 A1 2/2021

*Primary Examiner* — Younes Naji
(74) *Attorney, Agent, or Firm* — Baratta Law PLLC; Lawrence A. Baratta, Jr.

(57) ABSTRACT

Systems, methods, and non-transitory computer-readable media for coordinating modifications to a network device configuration (config) are provided. A system, according to one implementation, includes a processing device and a memory device configured to store a computer program having instructions that, when executed, enable the processing device to create a collaboration group including a plurality of contributing members. Each contributing member is adapted to provide proposed changes to a configuration for defining operating parameters of a Network Element (NE) in a network. The contributing members are adapted to provide the proposed changes within a predetermined timeframe. The instructions further enable the processing device to consolidate the proposed changes from the plurality of contributing members into a batched transaction and commit the batched transaction as a unitary transaction to encode modifications associated with the proposed changes from the plurality of contributing members into the configuration.

18 Claims, 4 Drawing Sheets

(56) References Cited

U.S. PATENT DOCUMENTS

| | | |
|---|---|---|
| 9,686,176 B2 | 6/2017 | Traxler et al. |
| 9,819,565 B2 | 11/2017 | Djukic et al. |
| 10,440,128 B2 | 10/2019 | Miedema |
| 10,680,739 B2 | 6/2020 | Swinkels et al. |
| 10,715,888 B2 | 7/2020 | Swinkels et al. |
| 10,735,837 B1 | 8/2020 | Al Sayeed et al. |
| 10,797,818 B1 | 10/2020 | Croskery et al. |
| 10,891,176 B1 | 1/2021 | Miedema |
| 10,958,993 B2 | 3/2021 | Swinkels et al. |
| 10,972,359 B2 | 4/2021 | Miedema et al. |
| 10,985,838 B1 | 4/2021 | Al Sayeed et al. |
| 10,992,374 B1 | 4/2021 | Miedema et al. |
| 2006/0177255 A1* | 8/2006 | Mizoi .................. G06F 3/1204 400/62 |
| 2006/0274348 A1* | 12/2006 | Suzuki .............. H04N 1/00233 358/1.14 |
| 2011/0078500 A1* | 3/2011 | Douros .................. G06F 9/466 714/15 |
| 2012/0147414 A1* | 6/2012 | Hutchings ............ G06F 3/1285 358/1.15 |
| 2012/0311603 A1* | 12/2012 | Kudo .................... G06F 3/0611 718/105 |
| 2014/0006597 A1* | 1/2014 | Ganguli ................ H04L 41/12 709/224 |
| 2014/0047085 A1* | 2/2014 | Peters .................... G06Q 30/06 709/221 |
| 2016/0149910 A1* | 5/2016 | Luque .................. H04L 63/061 713/171 |
| 2017/0180228 A1* | 6/2017 | Bielinski ............... H04L 43/026 |
| 2017/0192945 A1* | 7/2017 | Fulton ................ G06F 3/04842 |
| 2018/0309623 A1* | 10/2018 | Szobi .................. H04L 41/0869 |
| 2020/0019416 A1* | 1/2020 | Li .......................... G06F 3/017 |
| 2020/0036589 A1* | 1/2020 | A ........................ H04L 41/0816 |
| 2020/0252307 A1 | 8/2020 | Miedema |
| 2021/0042172 A1 | 2/2021 | Miedema et al. |
| 2021/0042173 A1 | 2/2021 | Prakash et al. |
| 2021/0075877 A1 | 3/2021 | Miedema et al. |

* cited by examiner

GROUPING CONFIGURATION-MODIFYING TRANSACTIONS FROM COLLABORATING AGENTS

TECHNICAL FIELD

The present disclosure generally relates to networking systems and methods. More particularly, the present disclosure relates to coordinating transactions from multiple agents for modifying the configuration parameters of a network device.

BACKGROUND

Generally, configuration parameters, which are installed on a network device, are used to define the operating characteristics of that network device. The configuration parameters may be stored in a datastore (e.g., database) associated with the network device. Network management protocols and datastore management protocols (e.g., Network Configuration Protocol (NETCONF), etc.) allow users to install, edit, and delete the configuration (config) of network devices operating in a network. These protocols support shared models in which multiple clients can collaborate on the same configuration-modifying transactions.

A candidate config (i.e., config to be modified) may be copied from a running network device or imported into a service. Multiple clients can all modify the same candidate config. However, this requires explicit coordination in terms of locking behavior and a single "commit" action to process the single transaction.

Therefore, the conventional configuration-modifying transactions can be undesirable for multiple reasons. For example, since the conventional techniques include explicit locking and commit, the clients would need to coordinate changes so that the commit process is only done when all clients are finished adding to the transaction. This coordination is costly to code and costly to execute. Also, the conventional pre-copy and commit approach is not intended for speed and can slow down the implementation process. Furthermore, there is considerable overhead associated with breaking up the actual config changes and the management of the datastore in the conventional techniques. There is therefore a need in the field of conducting transactions for modifying the config of a network device to overcome the deficiencies of the conventional systems and methods to provide a speedier and less expensive process.

BRIEF SUMMARY

The present disclosure is directed to systems and methods for managing config-modifying transactions from multiple sources. A system, according to one implementations, includes a processing device and a memory device, where the memory device may be configured to store a computer program having instructions that, when executed, enable the processing device to create a collaboration group including a plurality of contributing members. Each contributing member may be adapted to provide proposed changes to a configuration for defining operating parameters of a Network Element (NE) in a network. Also, the plurality of contributing members may be adapted to provide the proposed changes within a predetermined timeframe. The instructions further enable the processing device to consolidate the proposed changes from the plurality of contributing members into a batched transaction. Also, the processing device is enabled to commit the batched transaction as a unitary transaction to encode modifications associated with the proposed changes from the plurality of contributing members into the configuration.

According to additional implementations, the system may further be defined whereby the instructions may further enable the processing device to confirm that the contributing members are adapted to provide proposed changes to different, non-overlapping portions of the configuration. The instructions can also enable the processing device to delay the step of committing the batched transaction until a commitment from each contributing member has been received. Furthermore, the instructions may be configured to further enable the processing device to add one or more additional contributing members to the collaboration group or delete one or more existing contributing members from the collaboration group during the predetermined timeframe.

The contributing members may be associated with different nodes in a network-wide control plane adapted to control provisioning of services associated with the NE. The contributing members may alternatively be associated with portions of one device in a service path or control plane. The step of consolidating the proposed changes may include selecting a preliminary transaction from the proposed changes of a selected contributing member and using the proposed changes of the remaining contributing members to modify the preliminary transaction for forming the batched transaction.

In addition, the instructions may further enable the processing device to receive pre-selected settings from a user, where the pre-selected settings can be adapted to establish one or more of a minimum commit time, a maximum commit time, time extension parameters, a minimum number of contributing members in the collaboration group, a maximum number of contributing members in the collaboration group, and urgency parameters. The instructions further enable the processing device to provide notifications to the contributing members with respect to an estimated commit time, an extended commit time, and collaboration group information.

Also, the instructions may further enable the processing device to roll back the encoded modifications when a failure in the batched transaction is detected. In some embodiments, the system may further include a configuration database adapted to store the configuration. The configuration database may also be configured to store information that is related to one or more of the collaboration group, the contributing members, the proposed changes, the encoded modifications, the batched transaction, and the NE.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
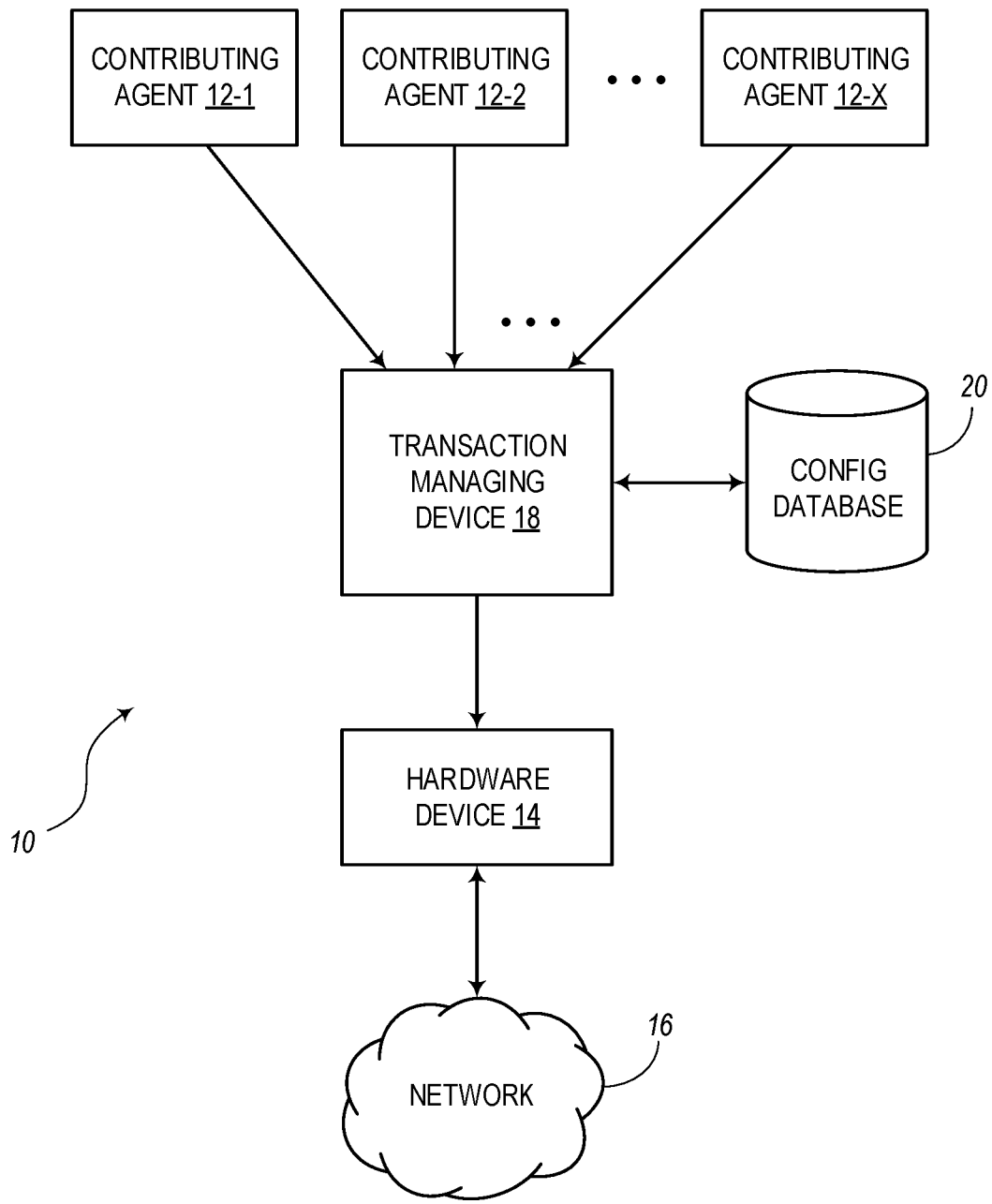
FIG. 1 is a block diagram illustrating a transaction collaboration system for enabling a plurality of users to collaborate on a transaction for modifying configuration parameters of a device in a network, according to various embodiments of the present disclosure.

FIG. 1 is a block diagram illustrating an embodiment of a transaction collaboration system 10 for enabling a plurality of users to collaborate on a transaction for modifying configuration parameters of a device in a network. In this embodiment, the transaction collaboration system 10 includes a plurality of contributing agents 12-1, 12-2, ..., 12-X (e.g., contributing members). The contributing agents 12-1, 12-2, ..., 12-X are each adapted to provide some type of contribution toward the modification of the configuration (config) or configuration parameters of a hardware device 14 operating in a network 16.

The contributing agents 12 may generically be referred to as nodes and may be local services managing individual portions of control plane elements. They can be processes or Virtual Machines (VMs) running on a processor, but can also be individual distributed services running in different places in the network. The contributing agents 12 may be containers, processes, clusters, which may be implemented in the transaction collaboration system 10 where they may or may not be in communication with each or may be aware or unaware of each other's presence. As shown in FIG. 1, all the contributing agents 12-1, 12-2, ..., 12-X are adapted to talk to a common configuration point for providing config to a common element.

In some embodiments, the contributing agents 12 may each represent a user, contributor, collaboration member, entity, or other human operator and/or a machine for automatically performing Machine Learning (ML) processes. The human-based or machine-based element may also be associated with one or more devices or interfaces that may be used by the human operator or automated machine.

The hardware device 14 in this embodiment may represent a network device, Network Element (NE), or other suitable type of device that operates, at least partially, according to a specific config associated with that device. Furthermore, the transaction collaboration system 10 includes a transaction managing device 18 for managing the config-modifying actions of the contributing agents 12. Also, a config database 20 may be connected to the transaction managing device 18 for storing at least the config associated with the hardware device 14 and/or one or more hardware devices operating in the network 16.

The transaction collaboration system 10 is configured to provide a way for multiple clients (e.g., contributing agents 12, contributing members, collaborators, etc.) who are collaborating on different aspects of the same config to be able to rapidly submit and commit changes to a shared transaction. In some embodiments, the contributing agents 12 may be able to provide contributions to the modifications of the config without knowledge of the existence or state of the other contributing agents. The contributing agents 12 may be kept from knowing about each other due to network architectural reasons. According to some embodiments, the transaction collaboration system 10 allows the multiple clients (e.g., contributing agents 12) to be able to do work on the config with the possibility of other clients also participating in a transaction.

In some embodiments, the contributing agents 12-1, 12-2, ..., 12-X may be part of a network-wide control plane that controls provisioning of services across multiple nodes. Signaling layers may reserve bandwidth across multiple logical entities that can be either local or remote to the hardware device 14. Again, these logical entities do not know that their peers are participating in the work order so they cannot collaborate on the transaction in the traditional sense. A signaling layer can provision services in nodes associated with contributing agent 12-1 and contributing agent 12-2. Left independent, these nodes may then provision, validate, and support each nodes' resources in the hardware layer. Each independent transaction from each node (e.g., contributing agent 12) may require significant overhead for processing, such as messaging, enqueuing, scope computation, staging, validation, commit, publication, etc.

Figure 2:
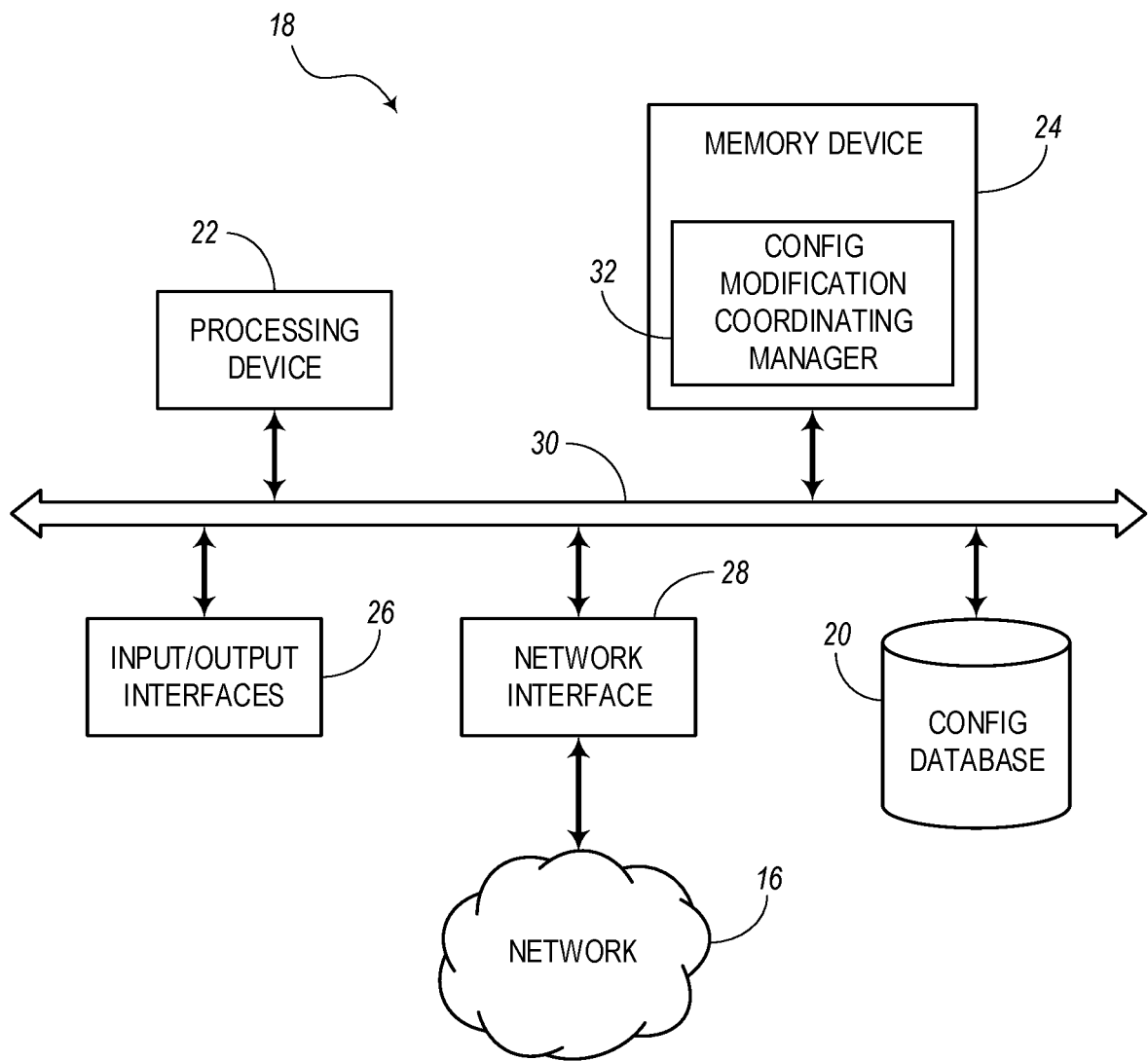
FIG. 2 is a block diagram illustrating a transaction managing device shown in FIG. 1 for coordinating proposed changes to the configuration parameters, according to various embodiments of the present disclosure.

FIG. 2 is a block diagram illustrating an embodiment of the transaction managing device 18 shown in FIG. 1 for coordinating proposed changes to the configuration parameters of the hardware device 14 and/or other devices, Network Elements (NEs), etc. operating on the network 16 or to be deployed on the network 16. In the illustrated embodiment, the transaction managing device 18 may be a digital computing device that generally includes a processing device 22, a memory device 24, Input/Output (I/O) interfaces 26, a network interface 28, and a database 20. It should be appreciated that FIG. 2 depicts the transaction managing device 18 in a simplified manner, where some embodiments may include additional components and suitably configured processing logic to support known or conventional operating features. The components (i.e., 20, 22, 24, 26, 28) may be communicatively coupled via a local interface 30. The local interface 30 may include, for example, one or more buses or other wired or wireless connections. The local interface 30 may also include controllers, buffers, caches, drivers, repeaters, receivers, among other elements, to enable communication. Further, the local interface 30 may include address, control, and/or data connections to enable appropriate communications among the components 20, 22, 24, 26, 28.

It should be appreciated that the processing device 22, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 22 may also include or utilize stored program instructions (e.g., stored in hardware, software, and/or firmware) for control of the transaction managing device 18 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 24 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 24 may incorporate electronic, magnetic, optical, and/or other types of storage media. The memory device 24 may have a distributed architecture, where various components are situated remotely from one another, but can be accessed by the processing device 22.

The memory device 24 may include a data store, database (e.g., database 20), or the like, for storing data. In one example, the data store may be located internal to the transaction managing device 18 and may include, for example, an internal hard drive connected to the local interface 30 in the transaction managing device 18. Additionally, in another embodiment, the data store may be located external to the transaction managing device 18 and may include, for example, an external hard drive connected to the Input/Output (I/O) interfaces 26 (e.g., SCSI or USB connection). In a further embodiment, the data store may be connected to the transaction managing device 18 through a network and may include, for example, a network attached file server.

Software stored in the memory device 24 may include one or more programs, each of which may include an ordered listing of executable instructions for implementing logical functions. The software in the memory device 24 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 22), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 22 or other suitable circuitry or logic). For example, when executed, the instructions may cause or enable the processing device 22 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., the processing device 22), or any suitable combination thereof. Software/firmware modules may reside in the memory device 24, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 26 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 26 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 28 may be used to enable the transaction managing device 18 to communicate over a network, such as the network 16, the Internet, a Wide Area Network (WAN), a Local Area Network (LAN), and the like. The network interface 28 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 28 may include address, control, and/or data connections to enable appropriate communications on the network 16.

Furthermore, the transaction managing device 18 may be configured to include a config modification coordinating manager 32, which may be implemented in any suitable combination of hardware, software, and/or firmware. When implemented partially or fully in software or firmware, the config modification coordinating manager 32 may be stored in the memory device 24 or other suitable non-transitory computer-readable media and may include instructions that, when executed, cause or enable the processing device 22 or other suitable processor to perform the actions described in the present disclosure for coordinating the transaction of modifying the configuration for the hardware device 14 and/or other network devices. When implemented partially or fully in hardware, the config modification coordinating manager 32 may be incorporated in the processing device 22 (e.g., as an ASIC). Note, that coordination is not always needed between clients. The current state (without coordination and grouping) usually results in locked, serialized transactions with a high degree of overhead.

In some embodiments, the config modification coordinating manager 32 may include the following steps or enable a suitable actor (e.g., the processing device 22) to perform the steps. For example, the steps may be associated with a method or process including creating a collaboration group including two or more of the plurality of contributing members 12-1, 12-2, . . . , 12-X, where each contributing member 12 is adapted to provide proposed changes to a configuration for defining operating parameters of a NE (e.g., hardware device 14) in a network (e.g., network 16). The contributing members 12 may also be adapted to provide the proposed changes within a predetermined timeframe, as described in more detail below. For example, the config modification coordinating manager 32 may be configured to discover contributing members 12 that are in the process of doing work to modify the config at about the same time. Also, the config modification coordinating manager 32 includes or causes the step of consolidating the proposed changes from the plurality of contributing members into a batched transaction. Then, the config modification coordinating manager 32 is configured to commit the batched transaction as a unitary transaction to encode modifications associated with the proposed changes from the plurality of contributing members 12 into the configuration.

In addition to these primary actions, the config modification coordinating manager 32 may further be adapted to confirm that the contributing members 12 are working on and/or providing proposed changes to different, non-overlapping portions of the configuration. The config modification coordinating manager 32 is also adapted to delay the step of committing the batched transaction until a commitment from each contributing member 12 has been received. Also, the config modification coordinating manager 32 can add one or more additional contributing members 12 to the collaboration group or delete one or more existing contributing members 12 from the collaboration group during the predetermined timeframe.

The contributing members 12 in these embodiments may be associated with different nodes in a network-wide control plane adapted to control provisioning of services associated with the NE. In other embodiments, the contributing members 12 may be associated with portions of one device in a service path or control plane.

The step of consolidating the proposed changes may include selecting a preliminary transaction from the proposed changes of a selected contributing member 12 and then using the proposed changes of the remaining contributing members 12 to modify the preliminary transaction in order to form the batched transaction. The config modification coordinating manager 32 may further be adapted to receive pre-selected settings from a user (e.g., network operator, network administrator, etc.). For example, the pre-selected settings may be adapted to establish one or more of a minimum commit time, a maximum commit time, time extension parameters, a minimum number of contributing members in the collaboration group, a maximum number of contributing members in the collaboration group, and urgency parameters.

The config modification coordinating manager 32, according to additional implementations, can also enable the processing device 22 to provide notifications to the contributing members 12 with respect to an estimated commit time, an extended commit time, and collaboration group information. The config modification coordinating manager 32 is also adapted to roll back the encoded modifications when a failure in the batched transaction is detected. In some embodiments, the transaction managing device 18 may further include a configuration database (e.g., database 20 associated with the config modification coordinating manager 32). The configuration database 20 can store the configuration along with other information related to the collaboration group, the contributing members, the proposed changes, the encoded modifications, the batched transaction, the NE (e.g., hardware device 14), and/or other features or components.

Regarding the transactions described in the present disclosure, multiple transactions may come from different clients. The clients do not coordinate among themselves, but they may be notified that they share a common "collaboration group" with the others. The clients can signal the incoming work and the transaction managing device 18 can track who is incoming in the same group. As the clients commit individually, they may either wait (if there are outstanding members in the group) or proceed with a final commitment (when all have committed). To consolidate the different transactions, one of the clients' transactions may be nominated as a base transaction and then take on all the config operations in the other transaction to thereby apply them to the base transaction. Any results from this base transaction (e.g., success, rollback, etc.) can be copied to all members of the group so clients can be aware of the status of the "collaborative" work.

Figure 3:
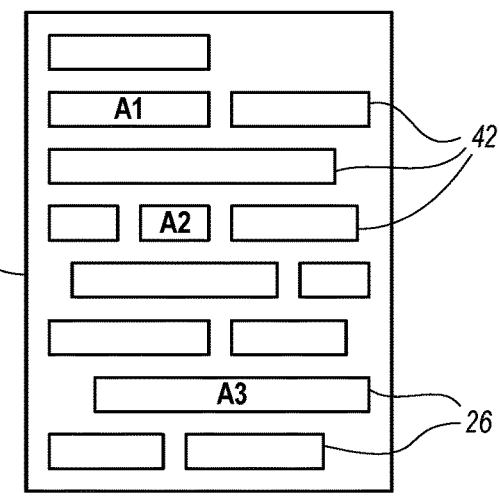
FIG. 3 is a diagram illustrating an example of multiple proposed changes in a configuration, according to various embodiments.

FIG. 3 generally shows an example of a configuration (config) 40 having a plurality of portions 42 for defining various aspects of operating parameters of the hardware device 14. In this example, multiple proposed changes (e.g., Change 1, Change 2, Change 3) are being proposed (in progress) for modifying different portions 42 of the config 40. It should be noted that the proposed Changes 1, 2, 3 do not overlap with each other. In other words, the contributing agents 12 may signal ahead-of-time what portion 42 of the config it is working on. The config modification coordinating manager 32 may be configured to receive the intent of each contributing agent 12 to make sure that no two contributing agents 12 are working on the same portion 42. If there is overlap between contributing agents 12, the config modification coordinating manager 32 may be configured to create multiple collaboration groups such that there is no overlap within any group.

Figure 4A:
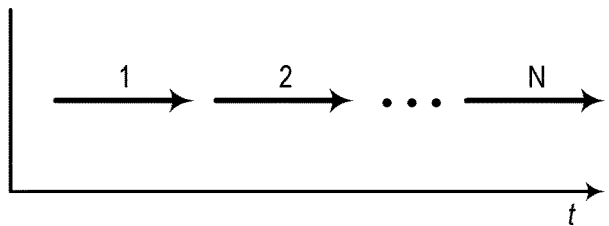
FIGS. 4A-4C are diagrams illustrating various serial and parallel processing scenarios with respect to conducting configuration transactions, according to various embodiments.
Figure 4B:
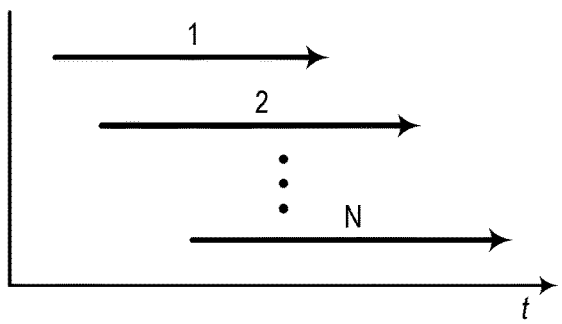
Figure 4C:
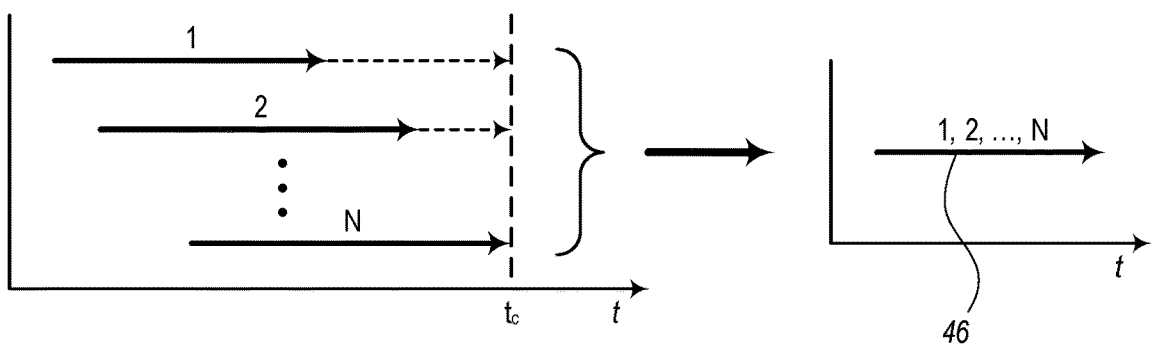

FIGS. 4A-4C are diagrams illustrating various serial and parallel processing scenarios with respect to conducting config transactions. FIG. 4A shows a scenario where a number of configuration transactions are conducted in a serial manner, where a first transaction (e.g., Transaction 1) is executed, followed by a second transaction (e.g., Transaction 2), and so on, until an Nth transaction (e.g., Transaction N) is conducted. In this scenario, there is no overlap (in time) between the transactions. In other words, Transaction 2 is not conducted until after Transaction 1 is complete.

FIG. 4B is another scenario where processing of config transactions can be performed in a parallel manner. This scenario assumes that a CPU (e.g., processing device 22) has the capacity to perform parallel processing in this respect. In may be noted that multiple transactions (e.g., Transaction 1, Transaction 2, . . . , Transaction N) can begin and end at the same or different times with respect to other transactions. Also, it may be noted that there some overlap (in time) among all the transactions in this set. Furthermore, it may be noted that FIGS. 4A and 4B can represent conventional processing of config transactions, and therefore FIG. 4C, as described below, is considered to be an improvement over the conventional systems. In particular, the actions of the config modification coordinating manager 32 provide a more efficient use of CPU resources and can therefore offer a savings in operating costs.

FIG. 4C, therefore, shows the results of the actions of the transaction managing device 18 and/or the config modification coordinating manager 32 to take the parallel processing scenario of FIG. 4B and consolidating the transactions (e.g., Transaction 1, Transaction 2, . . . , Transaction N) into a single, unitary transaction (e.g., batched transaction) that can be executed in one procedure (i.e., in only one CPU lane). Therefore, the config 40 (shown in FIG. 3), which includes multiple proposed changes being proposed at about the same time (within a certain timeframe, such as is shown in FIG. 4B), can be committed at one time (e.g., commit time $t_c$). Also, since there is no overlap in content (e.g., proposed changes in different portions 42 of the config 40), these changes can be committed at one time without the concern of interference. Thus, the consolidated transaction 46 (e.g., "Transaction 1, 2, . . . , N") includes no overlap with respect to content of the different proposals, but some overlap with respect to the working time of the different proposals.

Figure 5:
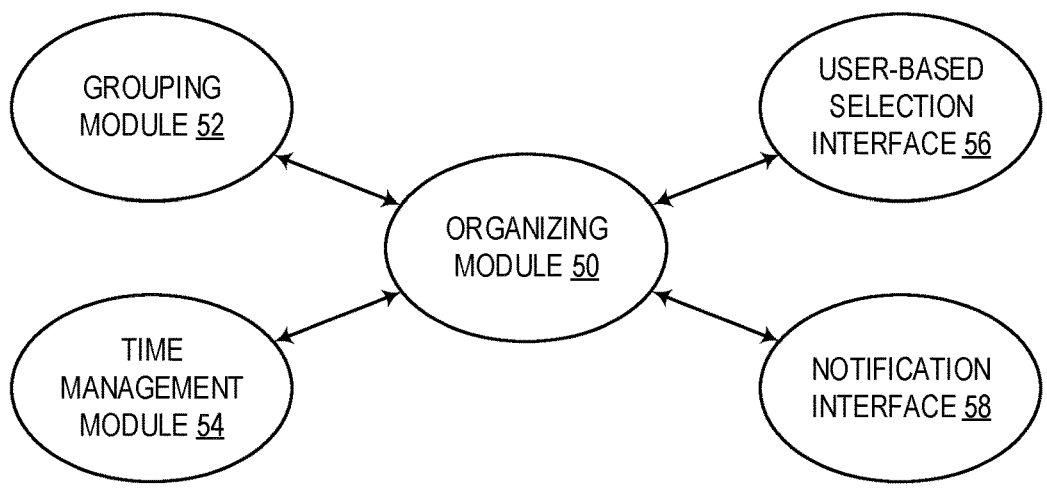
FIG. 5 is a block diagram illustrating the config modification coordinating manager shown in FIG. 2, according to various embodiments of the present disclosure.

FIG. 5 is a block diagram illustrating an embodiment of the config modification coordinating manager 32 shown in FIG. 2. In this embodiment, the config modification coordinating manager 32 includes an organizing module 50, a grouping module 52, a time management module 54, a user-based selection interface 56, and a notification interface 58, each of which may be implemented in any suitable combination of hardware and/or software. The organizing module 50 is configured to coordinate the operations of the other elements as needed. The grouping module 52 is configured to enable the forming of collaboration groups. The time management module 54 is configured to manage aspects of various timeframes of different collaboration groups, beginning and ending times of various contributing agent proposals, time extensions, etc. The user-based selection interface 56 is configured as an interface for receiving input with regard to selections of various time features, contributing agent criteria, etc. from a user (e.g., network administrator, network operator, etc.).

The grouping module 52 may be configured to communicate with the contributing agents 12 to determine what configs each is planning to work on. For contributing agents 12 working on the same config, the grouping module 52 can query them to find out if there is any overlap in the portion of the config being worked on. The grouping module 52 can also receive information about when each contributing agent 12 plans to begin work on the config and an estimated time when each contributing agent 12 plans to complete the work. By taking which contributing agents 12 are working on different portions of the same config at the same or similar times, one or more collaboration groups can be created. A batched transaction can be created from each collaboration group.

If multiple contributing agents 12 are working on the same portion of the same config at about the same time, the grouping module 52 may communicate with the potentially conflicting contributing agents 12 to inform them of the potential conflict. Also, in this case, the grouping module 52 may give options about whether a later arriving contributing agent 12 wishes to a) join only as an observer to see how the config is changed, b) leave the collaboration group in order to join another group, or c) leave the group and attempt to join another group at a later time.

Also, the grouping module 52 may be configured to allow contributing agents 12 to be added or deleted from collaboration groups. For instance, one or more contributing agents 12 may wish to leave a group at will. Also, if one or more contributing agents 12 wish to join an existing group, and if these contributing agents 12 meet the criteria for joining the group (e.g., same config, different portions of the config, about the same time), then they can be added to the join as well. Also, if, during the working timeframe, one or more of the contributing agents 12 changes the constraints of the portions 42 of the config 40 within which they intend to modify, the grouping module 52 may be configured to change the members of the various collaboration groups as needed to avoid conflict and to continue to meet the criteria (e.g., same config, different portions, about the same time) for being in the respective groups.

The time management module 54 may be configured to allow the various contribution agents 12 to enter or select different time parameters related to forming collaboration groups. Some time parameters may include when each contributing agent 12 intends to begin working on the modification, when they intend to finish the work, and how much flexibility they have with regard to a time when the config transaction is finally committed and put into play. For example, a contributing agent 12 may provide an "urgency" parameter, which may define how important it is to the agent 12 that the modifications are entered by a certain time.

The time management module 54 is also configured to enforce the various times that may be defined, based on the different modification timeframes, urgency parameters, timeframe overlaps among the various contributing agents 12, etc. The time management module 54 can also provide updates about pending deadlines, such as recommended, last-call, or extended times (e.g., "the config is scheduled to be committed by 1:30 pm today", etc.).

As an analogy, the time management module 54 (along with other elements of the config modification coordinating manager 32) may be configured to perform operations that could be compared to a shuttle bus leaving a station to go to an airport. In this sense, the shuttle bus represents the config modification coordinating manager 32 and the passengers of the shuttle bus represent the contributing agents 12. The value of the embodiments of the present disclosure can be realized from this analogy by observing that the serial processing (FIG. 4A) is a situation where there is one shuttle bus that takes passengers one at a time. The parallel processing of FIG. 4B is like several shuttle buses that each take only one passenger at a time. The preferred situation, however, is FIG. 4C, where there can be any number of shuttle buses and each shuttle bus can take a number of passengers who arrive at the station at about the same time. In the FIG. 4C implementation, the passengers may be unrelated and may arrive at a certain time, but may expect to wait a certain amount of time until the shuttle bus is filled to at least a certain level (if more passengers are seen to be coming).

The user-based selection interface 56 may be configured to receive input from a user (e.g., network administrator) for setting up how the config modification coordinating manager 32 is intended to be utilized in the network. The user-based selection interface 56 may be in communication with the user who can select or set certain time parameters and other parameters that can be used to define how the config modification coordinating manager 32 operates.

For example, the user may enter a minimum commit time, which may be an earliest time from the start of a new collaboration group that contributing agents 12 may be able to join and intend to commit. This may be used in the analogy to represent how often a new shuttle bus may arrive for a next group of passengers.

Also, the user may enter a maximum commit time, which may be a latest time, within reason, that contributing agents 12 may be willing to wait. In the analogy, this can be a situation of not forcing someone to wait too long for more passengers to arrive. These entries may include days, hours, minutes, second, etc., depending on the various urgencies for committing the config transactions. The time management module 54 may be configured to base a commit time on the latest expected commit time from the multiple members.

The user can also enter a parameter defining a minimum number of contributing agents in a collaboration group. By requiring a minimum number, the processing of the transaction may be more efficient, since it may only run when multiple members have joined (e.g., when at least a certain number of passengers have entered the bus). The user can also enter a wait time, which can define how long others will need to wait if the minimum number of contributing agents is not reached. The user may also enter another minimum time and maximum time for waiting if the member number criteria is not met.

Also, the user may select a condition where the minimum number of contributing agents is firmly set and the wait time may be indefinite. Although this might be the most efficient plan for maximizing the number of members in each transaction, it may cause some agents 12 to wait a long time for others to join.

The user-based selection interface 56 may allow the user to select whether or not a commit time is to be entered. This may be used in a situation where there are no urgency situations requested by the different contributing agents 12. Furthermore, based on the various urgency needs, the contributing agents 12 may need to request extra time (e.g., "I'm coming. Hold the door.") to complete the respective config changes. In this situation, the time management module 54 may be configured to add more time and create a later commit time. The user may also pre-select an option to allow this and/or to enter a maximum amount of time that the commit can be extended into the future. In other words, the shuttle bus cannot hold the doors open forever if a passenger is not trying to catch up. These parameters may be varied based on urgency levels (e.g., the bus should not wait for someone whose flight is three hours away when it may cause the onboard passengers to miss their flights).

The notification interface 58 may be configured to provide notifications to the various contributing agents 12. For example, the notification may include indication of upcoming commit times, which may instruct the users to finish up work as needed, provide commitment of their work, etc. These notifications can be considered to be a heads-up in advance of commit time, extended times, etc. (e.g., "the bus is leaving the station in 10 minutes"). Notifications can also be provided about the specific collaboration group and related information.

In addition, each transaction can fail and succeed independently. A failure can result in some aspect (e.g., one portion 42) being rolled back while others remain intact. It may be useful to have all related provisioning be combined into a single transaction so that both the overhead of the transaction, and the rollback can be done for all nodes/clients.

In order to support this, the present disclosure may further include a "tag" that is known to the clients that can associate the parallel transactions. This tag may be configured to identify that the clients (e.g., contributing agents 12) are sharing the same transaction and may include a collaboration group name, for example, which can be provided in the notifications of the notification interface 58. Also, the tag may identify each client uniquely.

An example may include two clients that are control plane related, named East and West, where the tags may be:

{"grouped-batch": true, "group": "control-plane", "member": "West"}
{"grouped-batch": true, "group": "control-plane", "member": "East"}

The same clients can also have another grouped batch in progress for other actions as long as the group name is different (so they will not be grouped together)

For the same two clients running an audit with a third client, the tags may be:

{"grouped-batch": true, "group": "control-plane-audit", "member": "West"}
{"grouped-batch": true, "group": "control-plane-audit", "member": "East"}
{"grouped-batch": true, "group": "control-plane-audit", "member": "North"}

The config modification coordinating manager 32 may also be configured to signal the tag to the config database 20 so that the parallel transactions can be linked. Also, each tagged transaction can be committed independently. A method may also include delaying the commit time, combining the group commits into one, and then returning the status and errors to all clients. The transaction collaboration system 10, transaction managing device 18, and/or config modification coordinating manager 32 may be configured to track all members of the group. When commits are accepted from each, the commit may be set to a pending state to await all other members to commit. In the meantime, other members may join the transaction or leave the transaction if they have not committed yet.

When all existing members in the transaction have committed, one transaction is nominated as the master transaction, and all changes requested by the other members will be grouped into this single transaction, which may be processed by the config modification coordinating manager 32. The resulting transaction may proceed and the config modification coordinating manager 32 may determine whether the transaction passes or fails (in its entirety). Other transactions may wait for a response regarding pass or fail. When the result of the transaction is reported back, the same result is copied to all waiting transactions and every contributing agent 12 is released to report the status back to the originating services.

This is intended for cases where the overhead of the transaction processing has a greater cost than the processing of the transaction itself. This is typically the case where declarative config is supported, since, for example, every transaction might be compared against running, diffs generated, validated, applied, and published. This may also be useful when roll-back or recovery processes from partial failures are expensive to process and it would be more robust and simpler to handle all related requests in a single transaction that can pass or fail atomically.

Independent services may be configured to identify when a transaction is grouped. The group name may be identified so members will know if they are associated with it. Also, the members may be uniquely identified so commits can be tracked (e.g., in config database 20) and discards can be processed (e.g., to exit the collaboration group).

Commits may be counted for all members in the group until all members (that still exist in the group at any one time) have all committed. The changes requested by each member will be merged into the single batched transaction and processed by a nominated transaction. Success or failure of the overall transaction may be reported back to all the original and/or existing group members via the notification interface 58.

There are additional attributes that can control how long to wait for commits and also if there is a grace period for lagging clients (e.g., variables controlled by the network administrator). In general, batch transactions can be improved and can be automatically discarded if a heartbeat or transport connection between the client and the server goes down.

Referring again to the analogy of the shuttle buses taking passengers to an airport, a group of people booked for a flight may be coming from different parking lots. They might not necessarily know about each other, but they all may have the same booking reference on their plane ticket. As they get on the shuttle bus, they might scan their boarding pass and the airport may keep track of how many people are "on their way," based on a common booking reference. As they arrive, they may then scan their tickets again to indicated that they have arrived and then get on the plane and wait for other passengers to arrive. If a shuttle breaks down, the passenger can signal to the airport that they will take the next flight, and that the plane should not wait for them. Once everybody is either on board or rescheduled, the crew can shut the doors and proceed to take-off. This can be similar to the various notifications and actions for informing related entities to wait or not wait based on various temporal factors.

Figure 6:
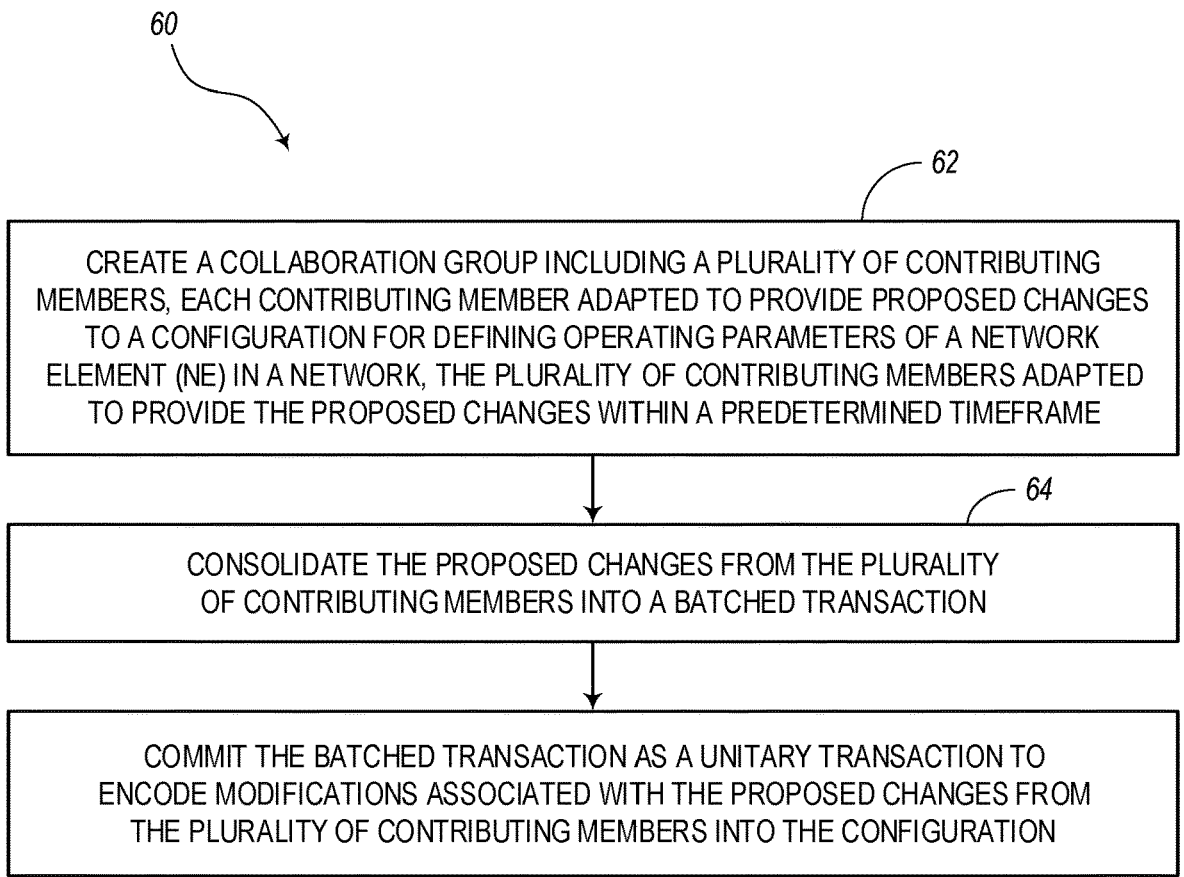
FIG. 6 is a flow diagram illustrating a process executable by the config modification coordinating manager shown in FIG. 2, according to various embodiments of the present disclosure.

FIG. 6 is a flow diagram illustrating an embodiment of a process 60, which may be executable by the config modification coordinating manager 32 shown in FIG. 2 or other elements of the transaction collaboration system 10. In this embodiment, the process 60 may include a step of creating a collaboration group including a plurality of contributing members, where each contributing member is adapted to provide proposed changes to a configuration for defining operating parameters of a Network Element (NE) in a network and where the contributing members are adapted to provide the proposed changes within a predetermined timeframe, as indicated in block 62. The process 60 also includes the step of consolidating the proposed changes from the plurality of contributing members into a batched transaction, as indicated in block 64. Also, the process 60 includes committing the batched transaction as a unitary transaction to encode modifications associated with the proposed changes from the plurality of contributing members into the configuration, as indicated in block 66.

Furthermore, in addition to the generalized step described above, the process 60 may include the step of confirming that the contributing members are adapted to provide proposed changes to different, non-overlapping portions of the configuration. The process 60 may also delay the step of committing the batched transaction until a commitment from each contributing member has been received. The process 60 may also include adding one or more additional contributing members to the collaboration group and/or deleting one or more existing contributing members from the collaboration group during the predetermined timeframe.

The contributing members may be associated with different nodes in a network-wide control plane adapted to control provisioning of services associated with the NE. Alternatively, the contributing members may be associated with portions of one device in a service path or control plane.

The step of consolidating the proposed changes may include 1) selecting a preliminary transaction from the proposed changes of a selected contributing member and 2) using the proposed changes of the remaining contributing members to modify the preliminary transaction for forming the batched transaction. Also, the process 60 may include receiving pre-selected settings from a user, whereby the pre-selected setting may be adapted to establish one or more of a minimum commit time, a maximum commit time, time extension parameters, a minimum number of contributing members in the collaboration group, a maximum number of contributing members in the collaboration group, and urgency parameters.

The process 60 may also include the step of providing notifications to the contributing members with respect to an estimated commit time, an extended commit time, and collaboration group information. Furthermore, the process 60 can roll back the encoded modifications when a failure in the batched transaction is detected.

In some embodiments, the process 60 may be executed by the transaction managing device 18, comprising at least the processing device 22 and memory device 24. Additionally, the transaction managing device 18 may include the configuration database 20, which may be adapted to store the configuration as well as information related to one or more of the collaboration group, the contributing members, the proposed changes, the encoded modifications, the batched transaction, and the NE.

Therefore, according to the various embodiments described in the present disclosure, multiple clients (e.g., contributing agents 12) may be allowed to participate in a shared transaction without explicit knowledge of other client requirements. This allows the overhead of transaction processing to be minimized by reducing the number of parallel transactions. Also, this allows related, but independent, transactions to be rolled back together if any of them fail.

The behavior of the config modification coordinating manager 32 can be selected or established by options, selections, parameters, etc. controlled by a client (e.g., network administrator). The systems and methods of the present disclosure may be implemented as APIs in distributed client devices where the various operations described herein can be made available to the clients to enable the forming of collaboration groups, joining/leaving existing groups, working on configuration changes within a certain timeframe, committing the work by certain deadlines, and allowing multiple other clients to perform other modifications to other portions of the same config, as described herein. In some implementations, the systems and methods described herein may be used in cases where network level operations have become fragmented and need to be reassembled for speed and cohesion. Control plane systems in particular can use this approach to speed up processing of bandwidth reservations, resulting in faster provisioning and restoration times.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
  a processing device, and
  a memory device configured to store a computer program having instructions that, when executed, enable the processing device to
    create a collaboration group including a plurality of contributing members, each contributing member configured to provide different proposed changes to a configuration for defining operating parameters of a Network Element (NE) that provides one or more services with other NEs in a network, the plurality of contributing members configured to provide the different proposed changes within a predetermined timeframe, where the different proposed changes are within set time parameters, and the different proposed changes are related provisioning changes in the network;

consolidate the different proposed changes from the plurality of contributing members into a batched transaction, wherein the different proposed changes from each of the plurality of contributing members do not overlap each other and that the plurality of contributing members do not need explicit knowledge of one another;

commit the batched transaction as a unitary transaction that is executable in one procedure to encode modifications associated with the different proposed changes from the plurality of contributing members into the configuration, and responsive to any of the different proposed changes in the unitary transaction failing, roll back the different proposed changes together because they are related to one another, wherein the set time parameters include one or more wait times and one or more commit times, wherein the different proposed changes arrive based on the one or more wait times and the different proposed changes are committed based on the one or more commit times.

2. The system of claim 1, wherein the instructions further enable the processing device to delay the step of committing the batched transaction until a commitment from each contributing member has been received.

3. The system of claim 1, wherein the instructions further enable the processing device to add one or more additional contributing members to the collaboration group or delete one or more existing contributing members from the collaboration group during the predetermined timeframe.

4. The system of claim 1, wherein the plurality of contributing members are associated with different nodes in a network-wide control plane configured to control provisioning of the one or more services associated with the NE.

5. The system of claim 1, wherein the plurality of contributing members are associated with portions of one device in a service path or control plane.

6. The system of claim 1, wherein consolidating the different proposed changes includes selecting a preliminary transaction from the different proposed changes of a selected contributing member and using the different proposed changes of the remaining contributing members to modify the preliminary transaction for forming the batched transaction.

7. The system of claim 1, wherein the instructions further enable the processing device to receive pre-selected settings from a user, the pre-selected settings configured to establish one or more of a minimum commit time, a maximum commit time, time extension parameters, a minimum number of contributing members in the collaboration group, a maximum number of contributing members in the collaboration group, and urgency parameters.

8. The system of claim 1, wherein the instructions further enable the processing device to provide notifications to the plurality of contributing members with respect to an estimated commit time, an extended commit time, and collaboration group information.

9. The system of claim 1, further comprising a configuration database configured to store the configuration and information related to one or more of the collaboration group, the plurality of contributing members, the different proposed changes, the encoded modifications, the batched transaction, and the NE.

10. A non-transitory computer-readable medium configured to store computer logic having instructions that, when executed, cause one or more processing devices to:

create a collaboration group including a plurality of contributing members, each contributing member configured to provide different proposed changes to a configuration for defining operating parameters of a Network Element (NE) that provides one or more services with other NEs in a network, the plurality of contributing members configured to provide the different proposed changes within a predetermined timeframe, where the different proposed changes are within set time parameters, and the different proposed changes are related provisioning changes in the network;

consolidate the different proposed changes from the plurality of contributing members into a batched transaction, wherein the different proposed changes from each of the plurality of contributing members do not overlap each other and that the plurality of contributing members do not need explicit knowledge of one another;

commit the batched transaction as a unitary transaction that is executable in one procedure to encode modifications associated with the different proposed changes from the plurality of contributing members into the configuration; and responsive to any of the different proposed changes in the unitary transaction failing, roll back the different proposed changes together because they are related to one another, wherein the set time parameters include one or more wait times and one or more commit times, wherein the different proposed changes arrive based on the one or more wait times and the different proposed changes are committed based on the one or more commit times.

11. The non-transitory computer-readable medium of claim 10, wherein the instructions further cause the one or more processing devices to delay the step of committing the batched transaction until a commitment from each contributing member has been received.

12. The non-transitory computer-readable medium of claim 10, wherein the instructions further cause the one or more processing devices to add one or more additional contributing members to the collaboration group or delete one or more existing contributing members from the collaboration group during the predetermined timeframe.

13. The non-transitory computer-readable medium of claim 10, wherein the instructions further cause the one or more processing devices to receive pre-selected settings from a user, the pre-selected settings configured to establish one or more of a minimum commit time, a maximum commit time, time extension parameters, a minimum number of contributing members in the collaboration group, a maximum number of contributing members in the collaboration group, and urgency parameters.

14. The non-transitory computer-readable medium of claim 10, wherein the instructions further cause the one or more processing devices to provide notifications to the plurality of contributing members with respect to an estimated commit time, an extended commit time, and collaboration group information.

15. A method comprising the steps of:

creating a collaboration group including a plurality of contributing members, each contributing member configured to provide different proposed changes to a configuration for defining operating parameters of a Network Element (NE) that provides one or more services with other NEs in a network, the plurality of contributing members configured to provide the different proposed changes within a predetermined timeframe, where the different proposed changes are within set time parameters, and the different proposed changes are related provisioning changes in the network;

consolidating the different proposed changes from the plurality of contributing members into a batched transaction, wherein the different proposed changes from each of the plurality of contributing members do not overlap each other and that the plurality of contributing members do not need explicit knowledge of one another;

committing the batched transaction as a unitary transaction that is executable in one procedure to encode modifications associated with the different proposed changes from the plurality of contributing members into the configuration; and responsive to any of the different proposed changes in the unitary transaction failing, rolling back the different proposed changes together because they are related to one another, wherein the set time parameters include one or more wait times and one or more commit times, wherein the different proposed changes arrive based on the one or more wait times and the different proposed changes are committed based on the one or more commit times.

16. The method of claim 15, further comprising the steps of: receiving pre-selected settings from a user, the pre-selected settings configured to establish one or more of a minimum commit time, a maximum commit time, time extension parameters, a minimum number of the plurality of contributing members in the collaboration group, a maximum number of the plurality of contributing members in the collaboration group, and urgency parameters; and providing notifications to the plurality of contributing members with respect to an estimated commit time, an extended commit time, and collaboration group information.

17. The method of claim 15, wherein the set time parameters include one of the plurality of contributing members requesting more time for a proposed change.

18. The method of claim 15, wherein the set time parameters are used to consolidate the different proposed changes based on urgency and flexibility for the committing.

* * * * *